United States Patent
Kenzo Huziwara et al.

(10) Patent No.: US 12,516,688 B2
(45) Date of Patent: Jan. 6, 2026

(54) DEVICE FOR REDUCING MULTIPHASE FLOW INSTABILITY IN PIPES

(71) Applicant: Petróleo Brasileiro S.A.—Petrobras, Rio de Janeiro (BR)

(72) Inventors: Wilson Kenzo Huziwara, Rio de Janeiro (BR); Jorge Roberto Duncan Lima, Rio de Janeiro (BR); Evandro Meneguello Biggi, Cubatão (BR); William Victor Carlos Candido, Rio de Janeiro (BR); Roberto Gliese, São Mateus do Sul (BR); Rafael Diego Graczyk, São Mateus do Sul (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 338 days.

(21) Appl. No.: 18/067,205

(22) Filed: Dec. 16, 2022

(65) Prior Publication Data

US 2023/0235759 A1 Jul. 27, 2023

(30) Foreign Application Priority Data

Dec. 16, 2021 (BR) ............ 10 2021 025513 7

(51) Int. Cl.
*F15D 1/02* (2006.01)
(52) U.S. Cl.
CPC ................... *F15D 1/025* (2013.01)
(58) Field of Classification Search
CPC ........................................ F15D 1/025
USPC ........................................ 138/40
See application file for complete search history.

(56) References Cited

U.S. PATENT DOCUMENTS

| | | | |
|---|---|---|---|
| 5,797,421 A * | 8/1998 | Merrett | A62C 35/68 137/513.5 |
| 6,041,803 A | 3/2000 | De et al. | |
| 6,568,478 B2 | 5/2003 | De | |
| 6,716,268 B2 * | 4/2004 | Molyneux | F17D 1/005 96/174 |
| 8,393,398 B2 | 3/2013 | Makogon et al. | |
| 8,459,285 B2 | 6/2013 | Calvert et al. | |
| 2007/0157985 A1 * | 7/2007 | Caro | A61F 2/06 138/40 |
| 2010/0147773 A1 | 6/2010 | Kouba et al. | |
| 2018/0023350 A1 * | 1/2018 | Lebedeva | B01F 23/233 166/254.1 |

FOREIGN PATENT DOCUMENTS

| | | |
|---|---|---|
| CN | 109838219 A | 6/2019 |
| GB | 2280460 B | 1/1997 |

OTHER PUBLICATIONS

Alekseenko et al. (Jul. 2009) "Primary Instabilities of Liquid Film Flow Sheared by Turbulent Gas Stream", International Journal of Multiphase Flow, 35(7):11 Pages.
(Continued)

*Primary Examiner* — David R Deal
(74) *Attorney, Agent, or Firm* — Morrison & Foerster LLP

(57) ABSTRACT

The present invention deals with a mechanical device with wide application in the reduction or elimination of severe slug or plug flow instabilities in horizontal or inclined gas-liquid multiphase flow pipes, which lead to a reduced operating capacity, mechanical risks of rupture due to repetitive efforts, and operational non-viability.

11 Claims, 14 Drawing Sheets
(2 of 14 Drawing Sheet(s) Filed in Color)

(56) References Cited

OTHER PUBLICATIONS

Farias et al. (2017) "Experimental Characterization of Linear Interfacial Waves In Horizontal Stratified Flow", Journeys in Multiphase Flows, 4:8 Pages.

* cited by examiner

DEVICE FOR REDUCING MULTIPHASE FLOW INSTABILITY IN PIPES

CROSS-REFERENCE TO RELATED APPLICATION

This application claims priority to Brazilian Application No. BR 10 2021 025513 7, filed on Dec. 16, 2021, and entitled "DEVICE FOR REDUCING MULTIPHASE FLOW INSTABILITY IN PIPES," the disclosure of which is incorporated herein by reference in its entirety.

FIELD OF THE INVENTION

The present invention deals with a mechanical device for application in the reduction or elimination of severe flow instabilities of the slug or plug type in horizontal or inclined multiphase flow pipes (liquid and gas or steam).

DESCRIPTION OF THE STATE OF THE ART

Multiphase flow pipes are commonly found in the oil industry, either in oil and gas production fields or in industrial processing facilities. These pipes are used to transport multiphase fluid streams composed of liquid fractions (such as hydrocarbons and water) and gaseous fractions (such as gases and vapors) in horizontal, vertical or inclined sections. Multiphase flows are found in refining plants, such as fuel stream hydrotreatment (HDTs) and distillation, and in offshore production facilities.

Under certain geometry and operation conditions, instabilities may occur in the flow with the formation or transition of the flow type as a stratified flow, a stratified wavy flow and slugs or plugs. In extreme cases, the gas phase and liquid phase flow is no longer stable and becomes oscillating between the flow of a stream almost entirely made of gas and another stream almost entirely made of liquid, with the presence of intermittent torpedoes or slugs/plugs of liquid (or a preferably liquid phase).

This type of issue causes problems, such as instability in the furnaces and heat exchanger batteries for preheating and cooling the streams, repetitive mechanical efforts, mainly in curved sections with a change of orientation from horizontal to vertical, or vice versa, which may lead to structural failure, impossibility of continuous and stable operation in oil gas-water separation equipment downstream of the oil production risers.

Thus, there is a need for a differentiated treatment for flow instabilities present in vertical and horizontal pipes. In the case of vertical pipes, the presence of instabilities is easily treated or controlled by the pipe geometry, reducing its diameter, or injecting gas or steam so that torpedo or plug-type flow instabilities are not present. Concerning horizontal pipes, even without the presence of accidents that cause accumulation of liquid phase (torpedo or plug), such as curves with a depression followed by an elevation, designated in the technical literature as instabilities caused by the pipe relief or geometry, there is a natural occurrence of instabilities resulting from the interaction between the flowing liquid and vapor phases. This phenomenon can be seen in nature as small waves that add up or, depending on the wind speed, transform into larger waves on the surfaces of lakes, rivers and oceans. Inside pipes, due to the physical restriction to the maximum wave height that can be formed, this can lead to the formation of torpedoes or plugs.

Currently, there are basically two approaches in the state of the art. The first one contemplates a reduction in the formation of flow instabilities, as seen in patents GB2280460B, U.S. Pat. Nos. 6,041,803, 6,568,478B2, 8,393,398B2.

Document GB2280460B discloses a solution to instability problems in risers or vertical flow pipes by reducing the flowing area. However, it does not solve the problem of torpedo or slugs/plugs formation in horizontal pipes and can make their presence even more severe.

Document U.S. Pat. No. 6,041,803 discloses a solution to reduce the effects of the formation of torpedo or plug instabilities in oil production risers, where the innovation accelerates the liquid phase forcing the presence of an annular stream the vertical pipe. Such a solution however fails to solve the natural presence of stratified flow in the vertical pipe, since this is only prevented by reducing the pipe diameter or injecting additional gas or steam.

Document U.S. Pat. No. 6,568,478B2 refers to an additional injection device for gas or steam in a vertical pipe in order to prevent the formation of torpedoes or slugs/plugs.

Document U.S. Pat. No. 8,393,398B2 deals with an invention that uses the same concept of accelerating the liquid phase as disclosed in patent U.S. 60/418,083 by transferring motion, not solving the return of the natural presence of the stratified flow in the vertical pipe and also leading to the artificial formation of torpedo pulses or slugs/plugs.

Document US2010147773 proposes to improve a gas-liquid mixture through a pre-separation and subsequent dragging of the liquid phase using the same pre-separated gas via a multihole mixer to transfer motion. This solution solves only locally the presence of torpedoes or slugs/plugs and still has the drawback of not solving the natural presence of stratified flow in the vertical pipe, since this is only avoided by reducing the pipe diameter or an additional injection of gas or steam.

Document US207180023350 discloses an invention that seeks to avoid the formation of torpedoes or slugs/plugs in horizontal pipes by means of gas and liquid phase mixers that force the flow in a dispersed manner by transferring motion from the gas phase. However, a high consumption of energy is required to maintain the flow.

The second state of the art approach corresponds to remediation of the mechanical and process effects of flow instabilities in equipment and pipes, as observed in U.S. Pat. No. 8,459,285B2, which discloses the use of a choke valve to reduce the amplitude of pressure fluctuations due to the presence of torpedoes or slugs/plugs in vertical pipes.

Other work, such as document CN109838219A, discloses a wellhead gas volume automatic adjustment control device and gas well two-flow well testing method.

The document by Alekseenko et al., "Primary instabilities of liquid film flow sheared by turbulent gas stream". International Journal of Multiphase Flow. 35. 617-627,10.1016/j.ijmultiphaseflow.2009.03.003, discloses a study on the scattering of artificially excited linear waves on the surface of the annular film cut by turbulent and countercurrent gas flow. The work discloses that to estimate the influence of certain factors, such as channel curvature, the possible hydrodynamic stabilization of film flow in the region of measurement, existence of low-frequency external vibrations, on dispersion dependencies, an integral approach is used. Also, an experimental wave control analysis apparatus is described using a reducer and filter for the experiments.

The document by Farias, P. S. C. et al., "Experimental Characterization of Linear Interfacial Waves In Horizontal Stratified Flow", 2017, discloses a study introducing controlled waves at the liquid interface in a stratified gas-liquid flow. Disturbances are introduced near the tube inlet and their evolution is analyzed for different Froude numbers of the mixture.

The study by Farias, P. S. C. et al. is intended to investigate the evolution of interfacial waves in stratified turbulent gas flow. The obtained experimental results show high degree of reproducibility, which allowed one to track the evolution of excited disturbances along the tube. Measurements were performed at flow rates close to the transition from smooth stratified to intermittent flow.

No state of the art document discloses a device to reduce instability in multiphase flows in horizontal or inclined pipes, even in the absence of pipe accidents, as will be presented in the present invention.

The present invention makes it possible to increase the reliability and integrity of equipment, since the presence of torpedoes or slugs/plugs cause mechanical fatigue by repetitive efforts.

The application of the invention leads to an increased production of S-10 diesel, which reduces SOx emissions from engines. The use of an anti-slug device in HDT units for the production of S-10 diesel oil makes it possible to operate at maximum design capacity or above, with greater flexibility in the allocation of loads in the HDR units, without the occurrence of vibration issues arising from "hydraulic hammer" instabilities in the pipe flow.

The invention allows UHDTs to operate at maximum load. Currently, mixtures with light loads or reduced hydrogen/load ratio are used to avoid the presence of torpedoes or slugs/plugs, or even the use of pipes with oversized diameters in the horizontal sections, which is a palliative solution for the existing operational condition.

This invention makes it possible to reduce the mechanical and structural risks resulting from flow surges, makes it possible to eliminate restrictions on the load quality or the $H_2$/load ratio, allowing increased conversion and selectivity, and promotes the use of the available capacity in UHDT (~10-20% of the nominal design load, or unstables) without the need of using thinners or oversizing the pipe diameter.

In addition, the present invention deals with a device that does not require external manufacturing and can be manufactured by the boiler shop itself. Its installation can be carried out in pit stop, not requiring a full shutdown, dealing only with the replacement of small sections or pipe spools. Furthermore, the invention prevents incidents or accidents due to leaks resulting from cracks in line elements (pipe end fittings) due to repetitive stress.

BRIEF DESCRIPTION OF THE INVENTION

The present invention deals with a device to reduce instabilities in multiphase gas-liquid flows, aiming to avoid the natural formation of torpedoes or slugs/plugs in horizontal sections.

The present invention has wide application in reducing or eliminating severe slug or plug flow instabilities in multiphase flow, horizontal or inclined pipes (liquid and gas or steam, at least), which lead to reduced operating capacity, mechanical risks of rupture due to repetitive efforts, and operational unfeasibility.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be described in more detail below, with reference to the attached figures which, in a schematic and non-limiting manner of the scope of the invention, represent examples of embodiments thereof. In the drawings.

DETAILED DESCRIPTION OF THE INVENTION

Figure 7:
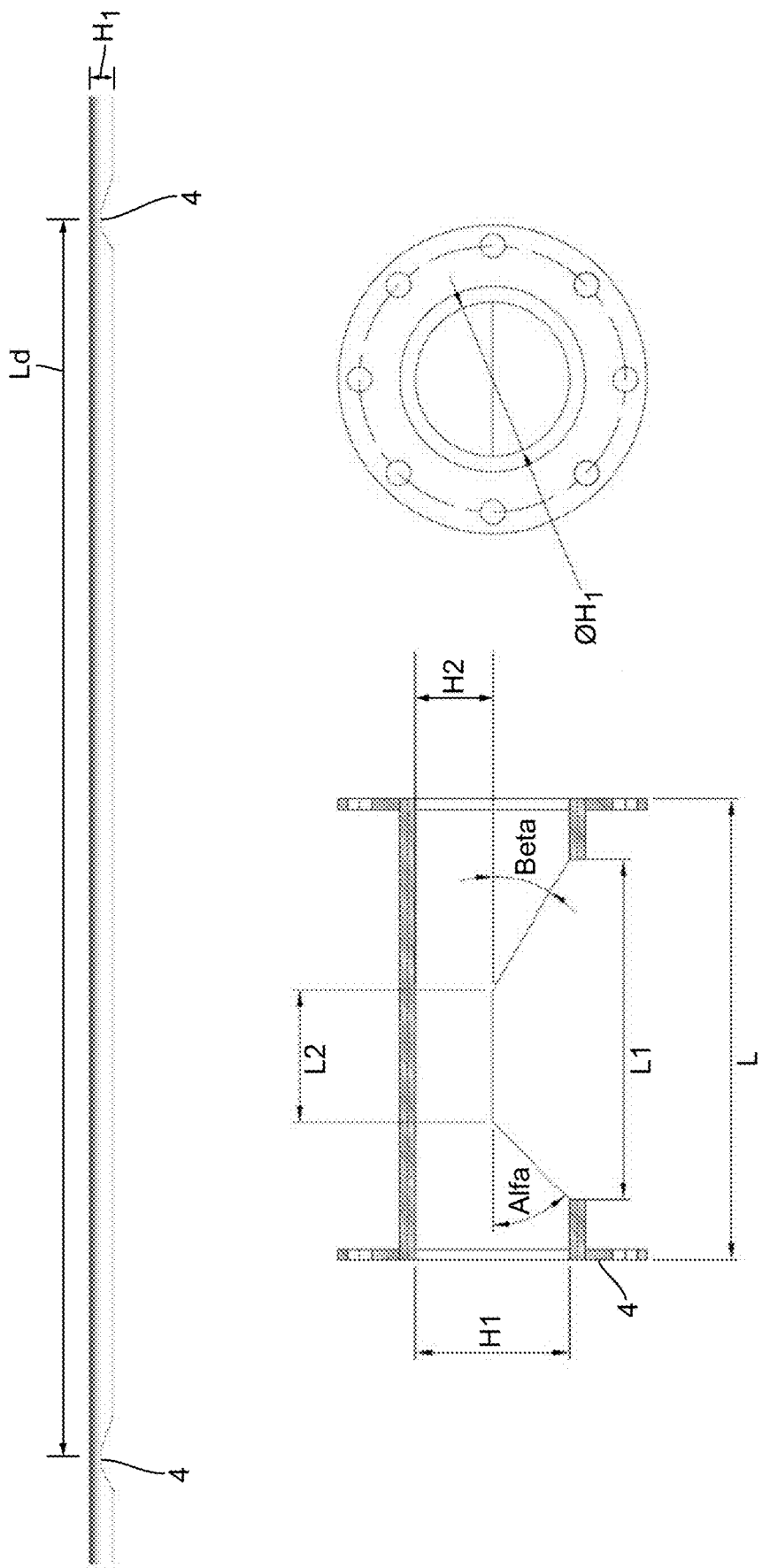
FIG. 7 illustrates the geometry and sizing of the components of the present invention.

The device to reduce instabilities in multiphase gas-liquid or vapor-liquid flows in horizontal or inclined pipes according to the present invention and illustrated in FIG. 7, comprises a pipe section or spool where constructive and installation details are presented, the geometric parameters being defined by the following relationships:

a) H2/H1: greater than 0.1 and preferably less than 0.5. Depending on the fluid properties and volumetric flow rates, this ratio can be of up to 0.9;

b) ALPHA angle: preferably greater than 20 and lower than 45 degrees. Depending on the fluid properties and volumetric flow rates, this angle can be of up to 70 degrees;

c) BETA angle: greater than 10 and lower than 45 degrees. Preferably, using an angle of 25 degrees, but depending on the properties of fluids and volumetric flow rates, the BETA angle can be up to 70 degrees;

d) L2/H1: preferably 0.20 to 0.80, but depending on the fluid properties and volumetric flow rates it can be up to 1.0; and e) Ld/H1: 25 to 100. Preferably 50 depending on the fluid properties and volumetric flow rates.

Nomenclature Used in FIG. 7:
H1 is the height or diameter of the pipe section;
H2 is the height or diameter fraction that defines the flow section area, which limits the maximum wave height;
ALPHA is the converging angle of the inlet section that causes the formation of descending flow streams (6);
BETA is the divergent angle of the outlet section;
L is the length of the spool or section of the device;
L1 is the total length of the device;
L2 is the length of the thickness of the interaction zone between the gas and liquid phases;
Ld is the distance between devices recommended for installation.

Figure 1:
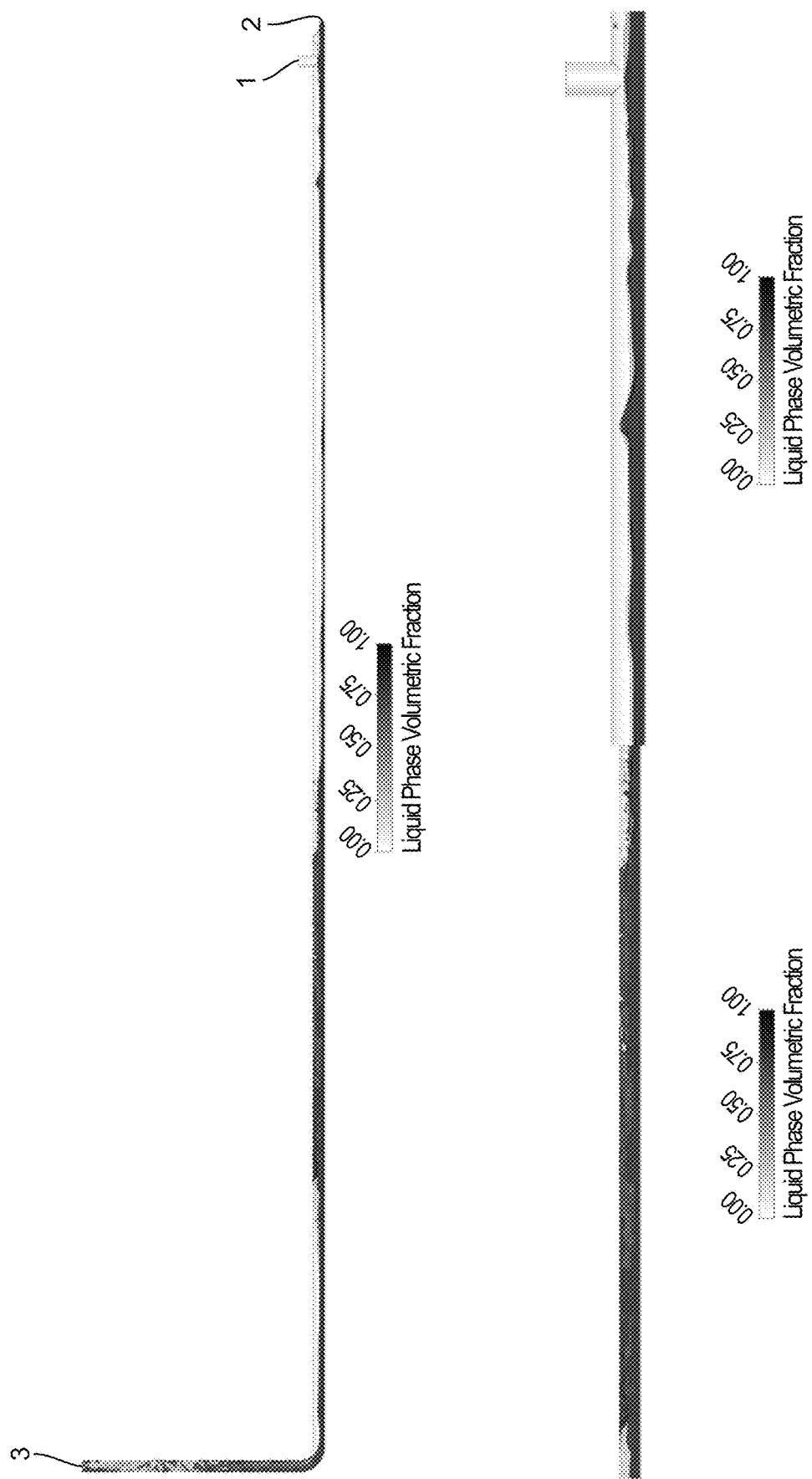
FIG. 1 illustrates a standard natural flow profile without the application of the present invention, in t.
Figure 1A:
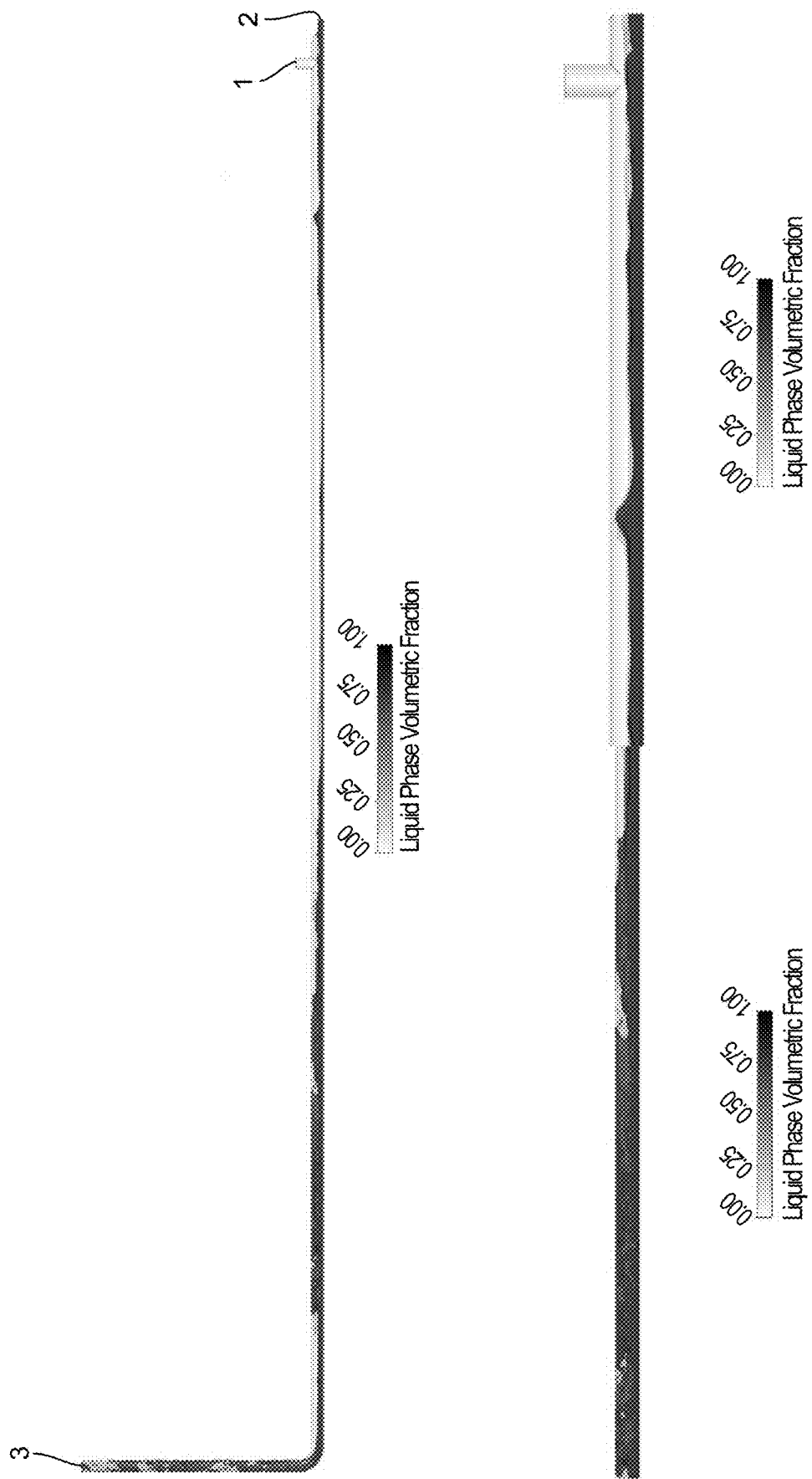
FIG. 1A illustrates a standard natural flow profile without the application of the present invention, in t+120 ms.

The present invention has been developed to avoid the formation of torpedoes or slugs/plugs in horizontal sections, hence minimizing or removing the additional consumption energy required for this. In gas-liquid flows, the formation of waves on the separation surface between the phases is natural due to phenomena of exchange of motion between the two flowing phases, with their physical properties, such as surface tension, density and viscosity, influencing the generation and shape of these waves. It is important to emphasize that waves are phenomena occurring in the neighborhood of the liquid phase surface. These waves, after being formed, tend to accelerate their speed due to the continuous transfer of motion from the gas phase to the wave surface, as well as they tend to increase its height due to surface tension and the accumulation or encounter with another wave that forms downstream. As can be seen in FIGS. 1 and 1A, which illustrate this phenomenon, and explain in nature the existence of large waves on high seas in the presence of storms. If it were not for the physical limit of the pipe diameter, the waves would propagate without forming any torpedoes or slugs/plugs of liquid, since these waves, when touching the upper surface of the pipe, lead to the formation of a liquid-rich region or a fully liquid region spanning the entire section of the pipe, with a length that depends on the physical properties (viscosity, surface tension and density) and phase speed.

There are several reports in the literature that this phenomenon of torpedo or slug/plug formation takes place most of the time when the liquid phase occupies more than 50% of the flow section and after the flow has developed for a length/diameter ratio greater than 50, depending on the physical properties of the phases.

This is a natural phenomenon that occurs in gas-liquid flows at low speed, or in the so-called stratified (wavy and slug/plug) flows, which are the most commonly found under the operating conditions of industrial refining and oil production equipment, and which are also used because they consume less energy for the flow despite the presence of instabilities or pulses.

Figure 2:
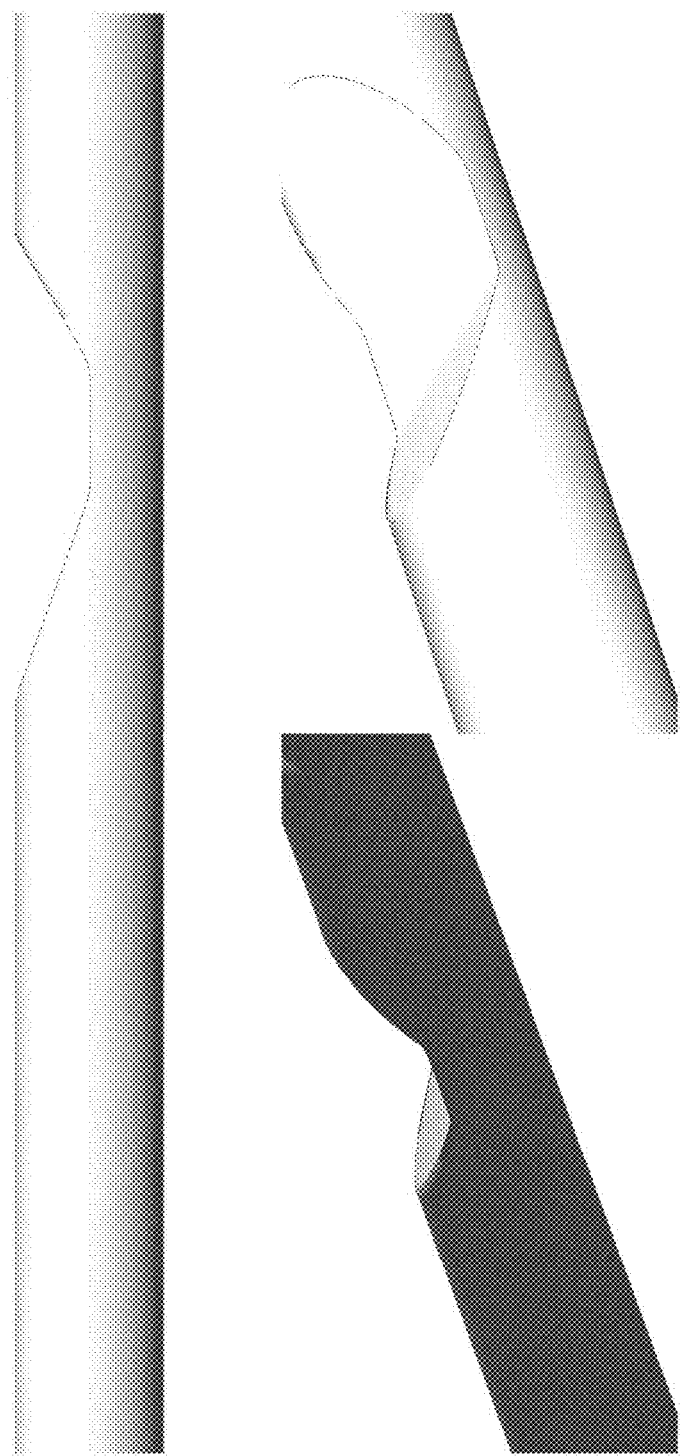
FIG. 2 illustrates views of the device of the invention with no flow.
Figure 2A:
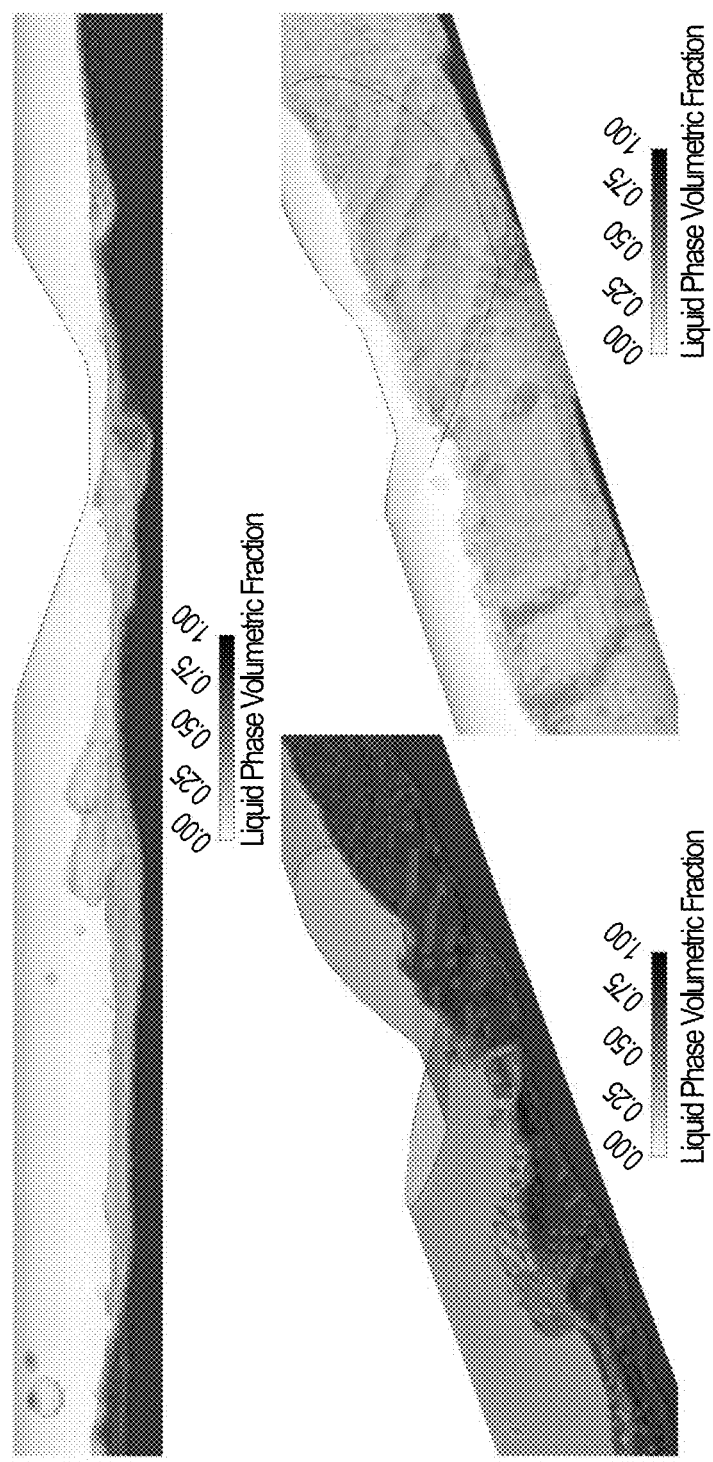
FIG. 2A illustrates views of the device of the invention with flow.
Figure 2B:
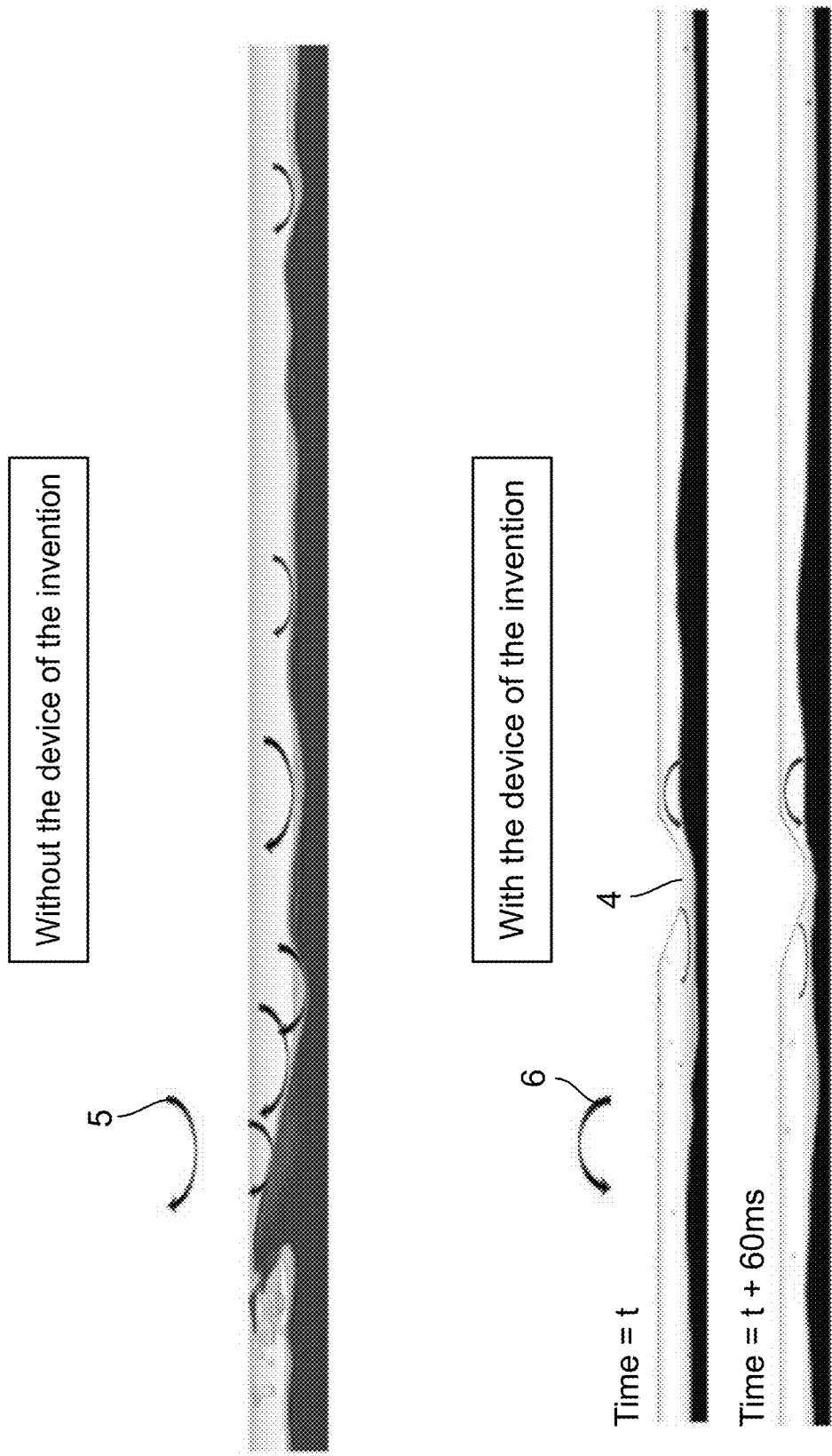
FIG. 2B illustrates the operating principle of the device of the present invention.
Figure 3:
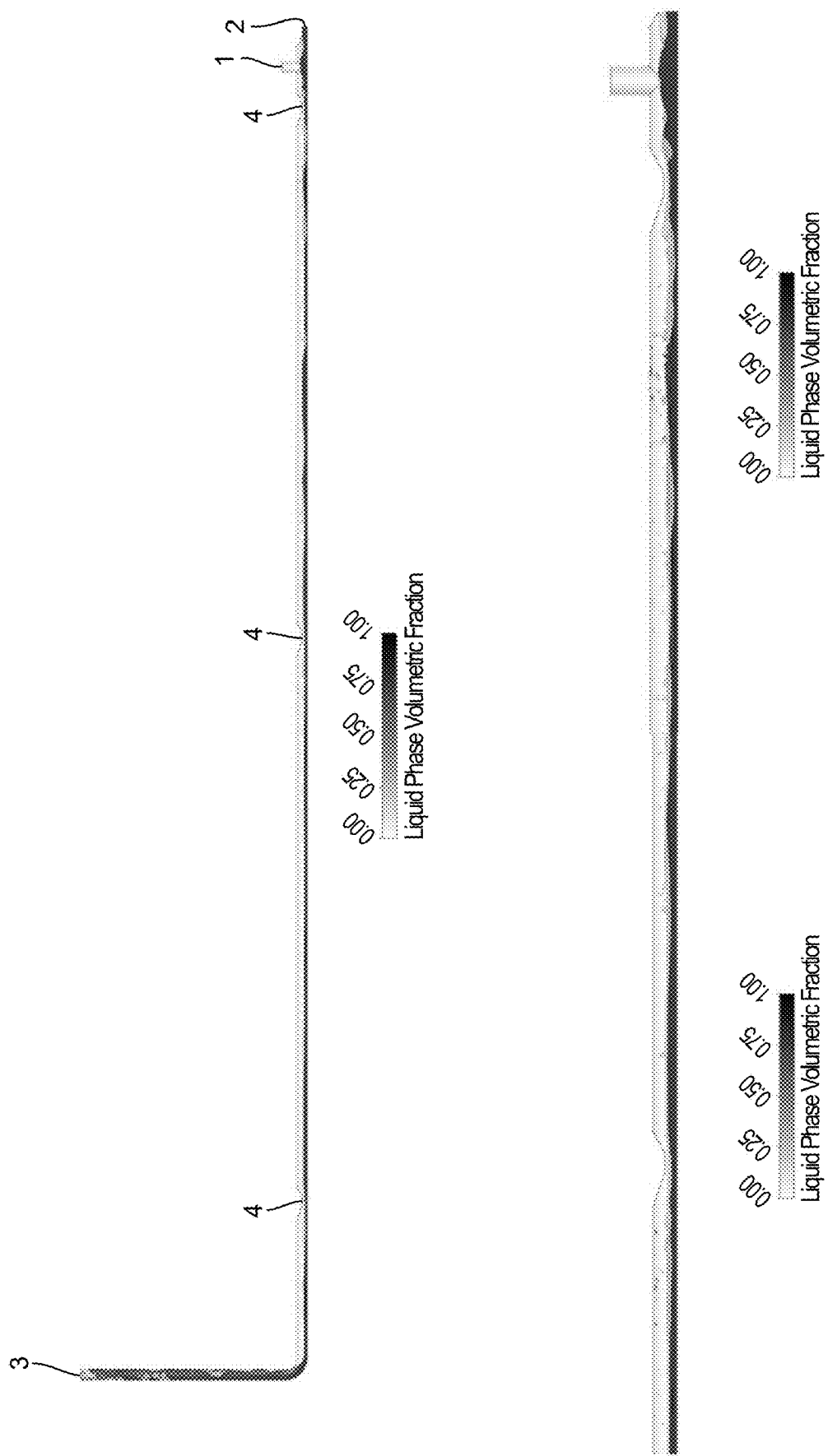
FIG. 3 illustrates a standard natural flow profile with application of the present invention, in t.
Figure 3A:
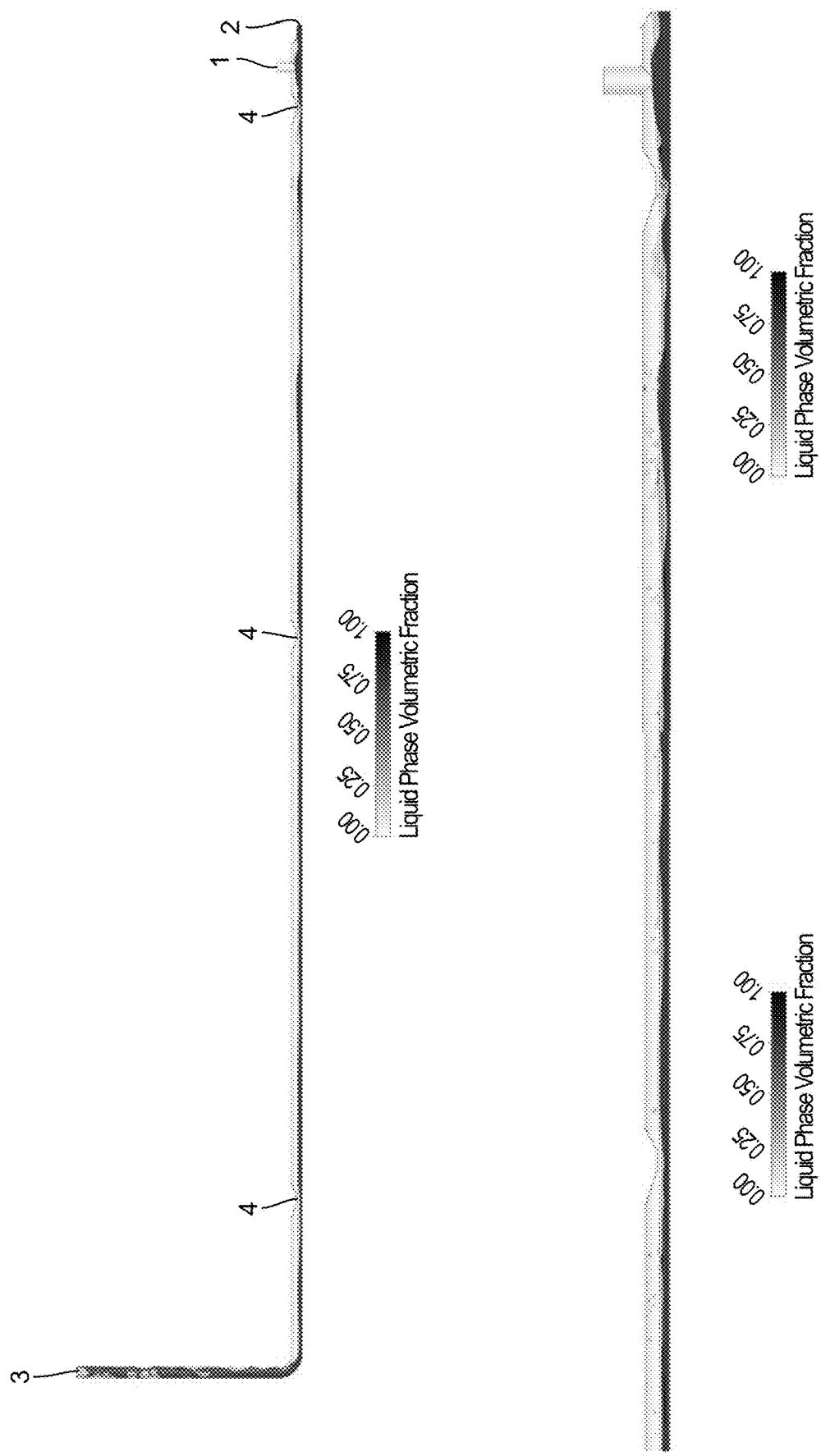
FIG. 3A illustrates a standard natural flow profile with application of the present invention, in t+50 ms.

The present invention uses a mechanical device with an appropriate geometry, as seen in FIGS. 2 and 2B, which prevents the formation of torpedo or slug/plug, minimizing or canceling the additional consumption of energy by limiting the wave height by acting preferentially in the wave region, which is known to be a phenomenon that occurs only in a region close to the liquid phase surface (FIGS. 3 and 3A).

FIG. 2B shows the operating principle of the device of the invention, which, unlike those found in the state of the art, does not use the principle of changing the stratified flow to high energy consumption flows, such as annular and dispersed flows, but instead uses the principle of killing or dissipating the rising waves by changing the direction of gas streams from ascending (5), which are in generation and acceleration, to descending (6), eliminating or dispersing the waves before they occupy the entire space of the pipe, or join others downstream due to the acceleration that occurs upstream.

It is important for the device to have a geometry where the gas phase-liquid phase interaction occurs preferentially in the region close to the surface of the liquid phase of the wave. It is noteworthy that the effects of acceleration in waves occur only in the region close to the surface of the liquid phase due to surface tension. Therefore, the device of the present invention has the effect of reducing the flow pressure differential, as it is an equipment that seeks to transfer motion only to the wave, which occurs in the region close to the liquid phase surface.

The information below is presented to fully illustrate the nature of the present invention and how to practice the same, without, however, being considered limitative of its content.

To validate the development of the device of the present invention, tests were made in an experimental plant using electrical resistance tomography and computational fluid dynamics experimentation to capture the fluid dynamic effects.

FIGS. 1 and 1A detail the fluid dynamic principles that support the invention, showing the flow regime at a time interval of 120 ms, for which the present invention is applied, wherein there is a transition from a stratified flow to the torpedo or slug/plug flow, which is due to the acceleration of individual waves that associate each other or join together to form larger waves, until the entire section of the pipe is occupied. In FIGS. 1 and 1A, (1) is the gas phase inlet, (2) is the liquid phase inlet, and (3) is the outlet of gas and liquid phase mixture.

FIGS. 2 and 2A show the device of the present invention, both externally and internally. FIG. 2B presents the concept of operation of the device of the present invention (4). In the absence of the device (4), the ascending gas phase flow streams (5) promote the formation and acceleration of waves in liquid phase, tending to occupy the entire area of the flow section or increase the volumetric fraction of the liquid phase. Use of the device (4) causes the formation of descending gas phase flow currents (6) that dissipate the waves formed, reducing the area of the flow section occupied by the liquid phase or its volumetric fraction.

FIGS. 3 and 3A show the correction of instability shown in FIGS. 1 and 1A using the device of the invention, with a time frame of 50 ms, without the presence of slugs/plugs. In FIGS. 1 and 3A, (1) is the gas phase inlet, (2) is the liquid phase inlet, and (3) is the gas and liquid phase mixture outlet and (4) are the devices of the present invention.

Figure 4:
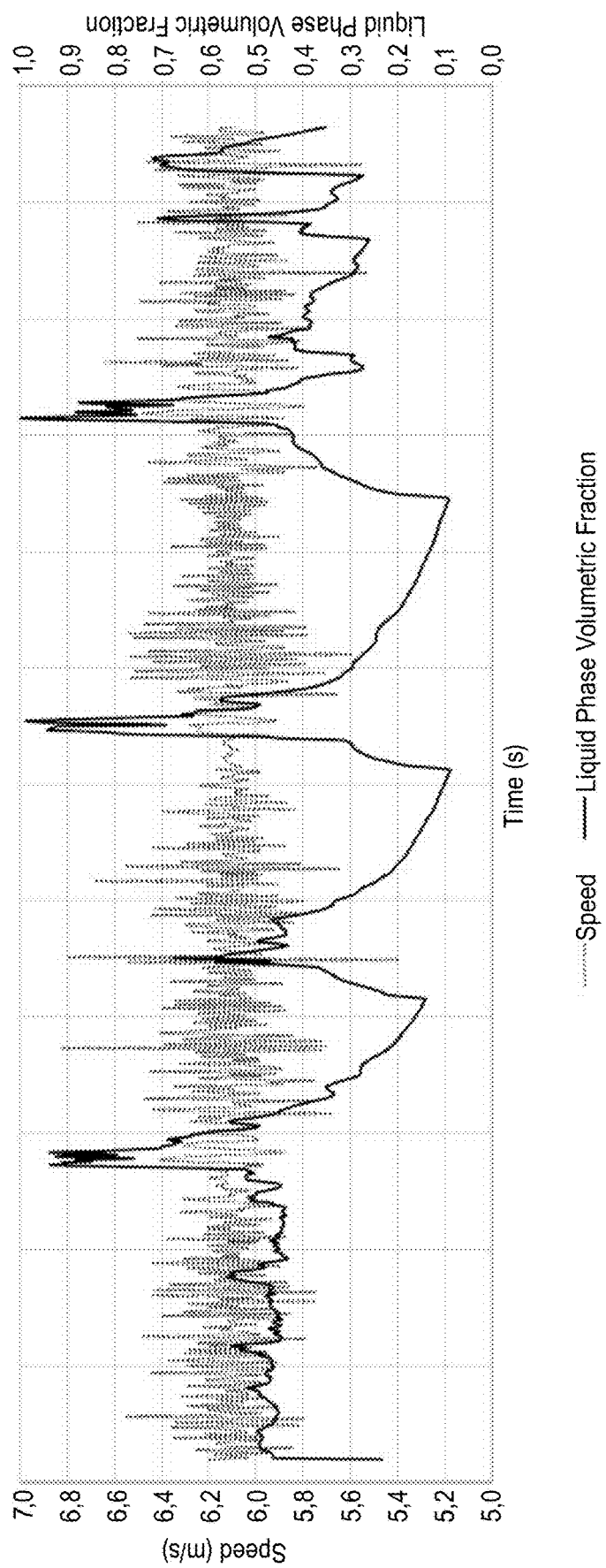
FIG. 4 illustrates the speed profile and the volumetric fraction of the liquid phase in the absence of the device of the present invention.
Figure 4A:
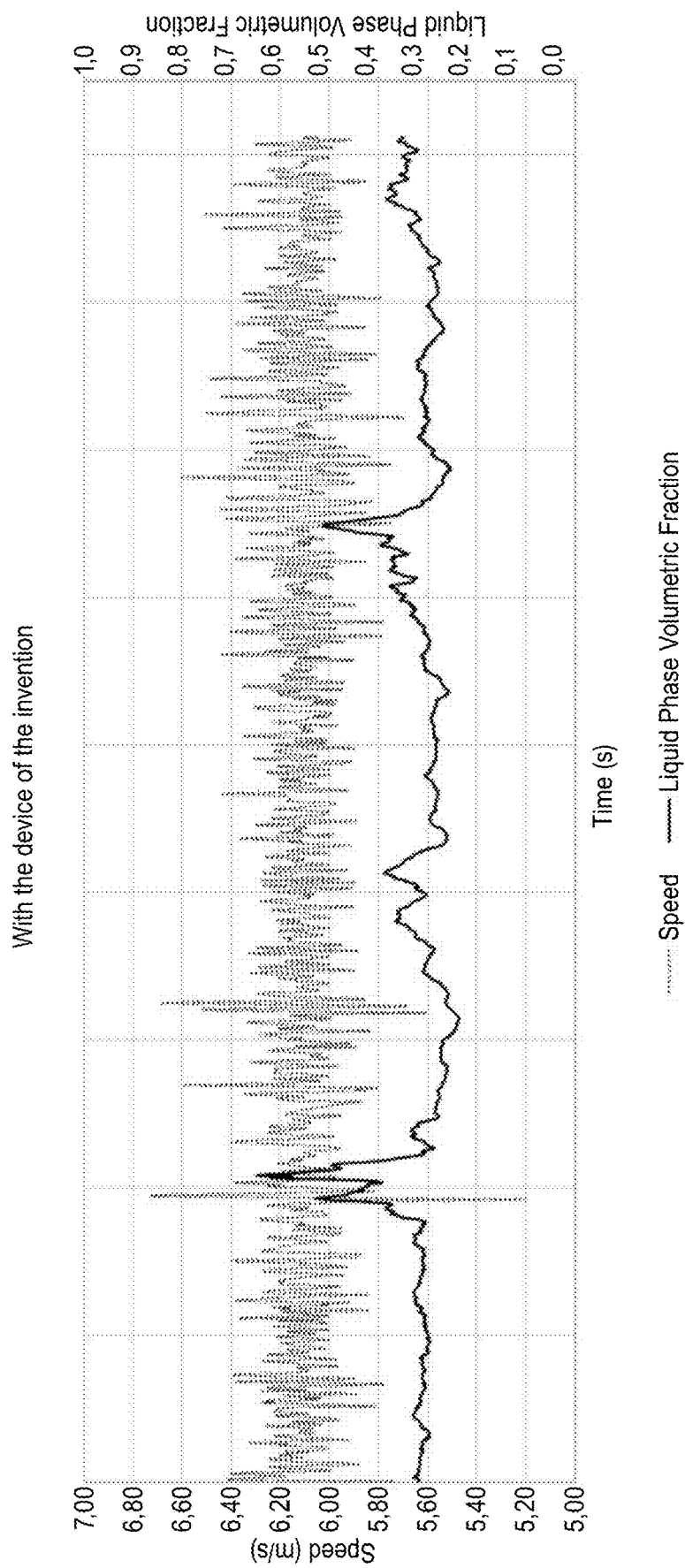
FIG. 4A illustrates the effect on speed and volumetric fraction profile of the liquid phase using the device of the present invention.

FIGS. 4 and 4A, without and with use of the device of the present invention, respectively, show quantitatively the effect of the device of the invention on the variables speed and volumetric fraction of the liquid phase, eliminating the presence of pulses of flow with a volumetric fraction of the liquid phase close to 1 (one). It should be noted that the speed (gas and liquid phase) and the liquid phase fraction are average values over the entire area of the flow section.

Figure 5:
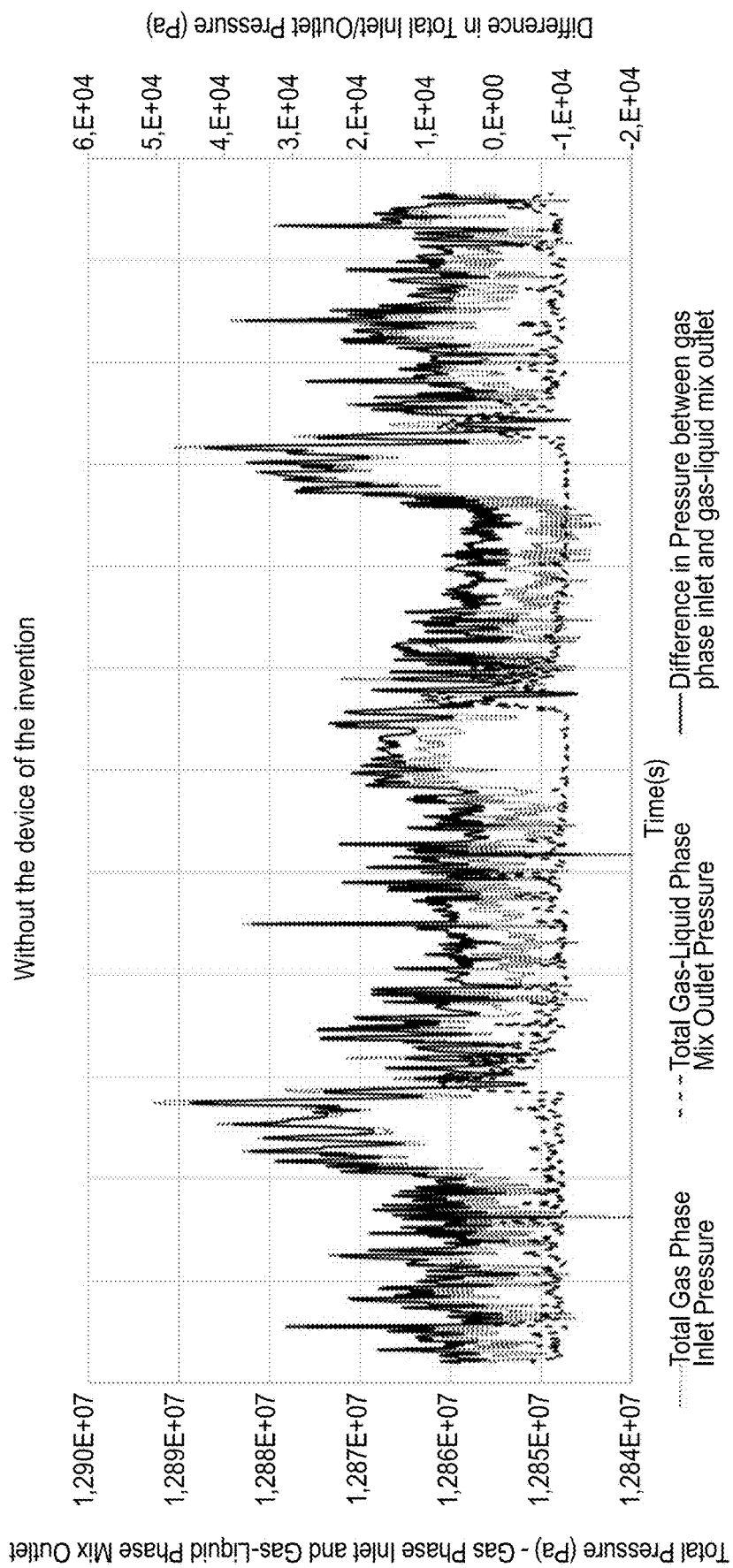
FIG. 5 illustrates the total pressure profile of the inlet and outlet and the total pressure differential between inlet and outlet in the absence of the device of the present invention.
Figure 5A:
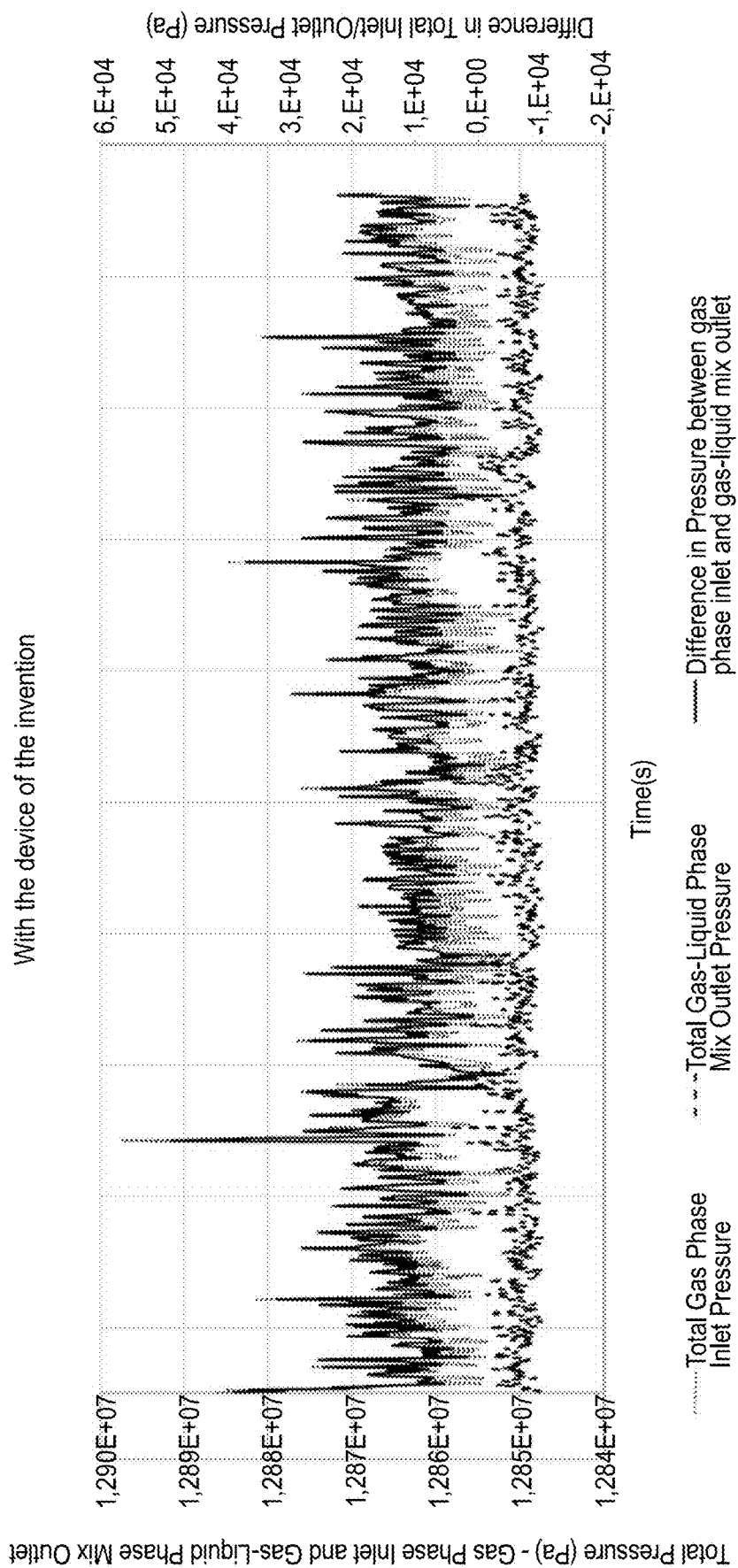
FIG. 5A illustrates the effect on the total pressure profile of the inlet and outlet and the total pressure differential between inlet and outlet using the device of the present invention.

FIGS. 5 and 5A, without and with use of the device of the present invention respectively, show quantitatively the effect of the device of the invention in reducing instabilities in the total pressure (sum of the static pressure and dynamic pressure), as well as the fact that that the use of the device does not entail additional consumption of energy for rectifying the flow, including a substantial reduction the energy required for the flow (of the order of 50% reduction in consumption peaks).

Figure 6:
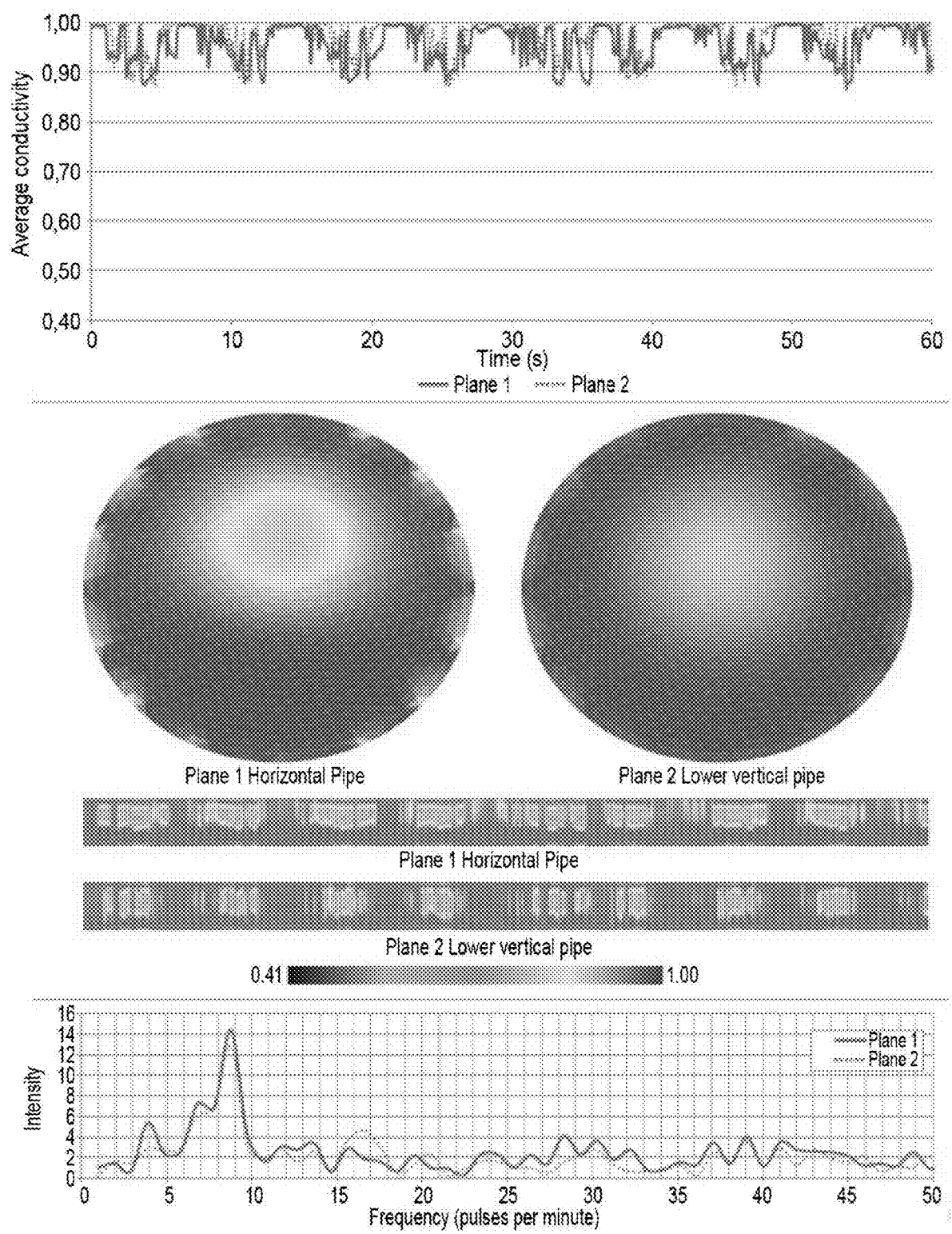
FIG. 6 illustrates ERT (electrical resistance) tomography in the presence of slugs or plugs in horizontal flow followed by vertical with instability.

FIG. 6 presents experimental data using high temporal resolution electrical resistance tomography showing the presence of torpedoes or slugs/plugs. The presence of slugs/plugs is identified by regions with normalized conductivity values close to 1 (one) or by the color tending towards red.

Figure 6A:
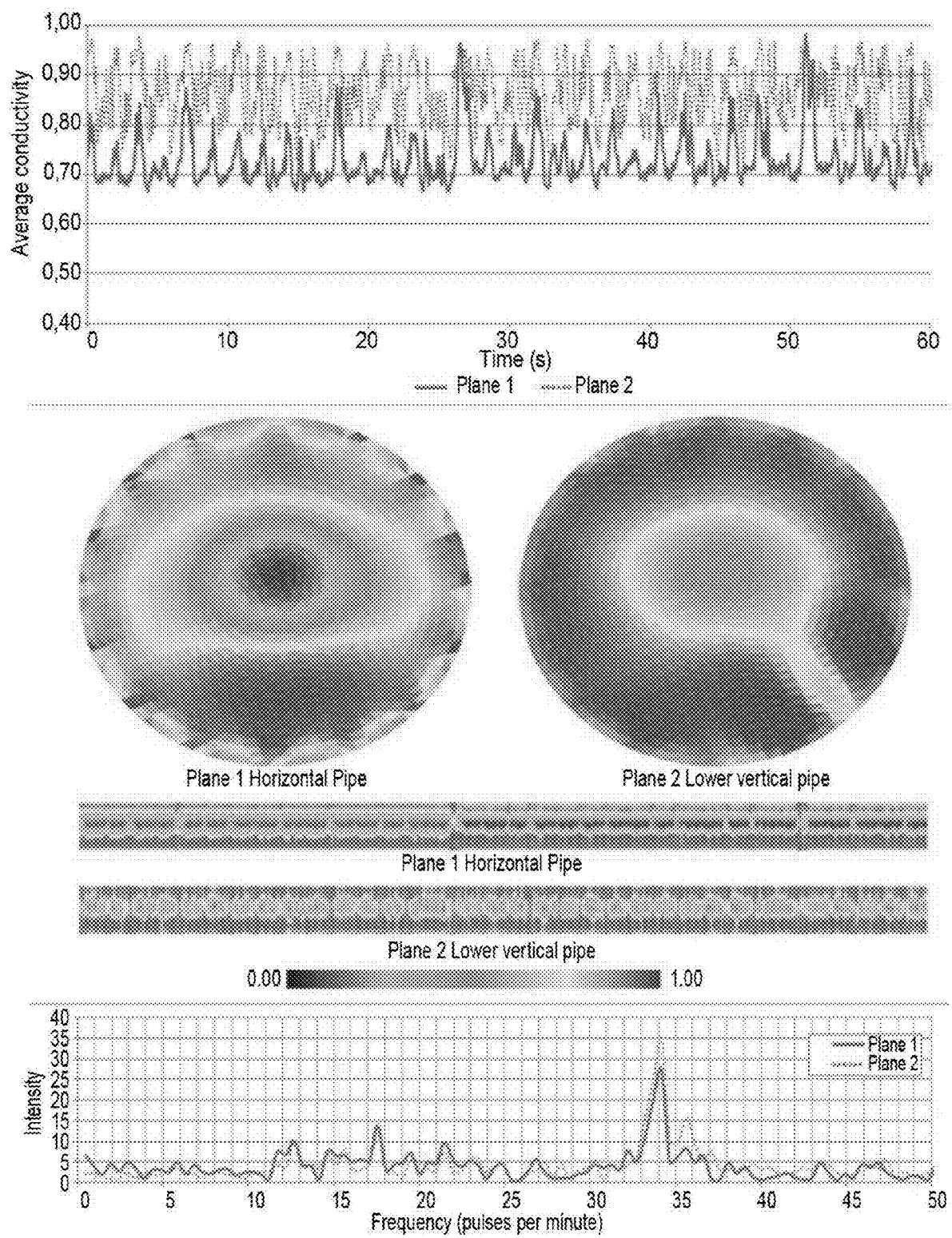
FIG. 6A illustrates ERT (electrical resistance) tomography in the absence of slugs or plugs in the horizontal flow followed by vertical flow after correction of instabilities using the device of the present invention.

FIG. 6A presents experimental data using high temporal resolution electrical resistance tomography, showing the absence of torpedoes or slugs/plugs after correcting the flow using the device of the invention. The absence of slugs/plugs is identified by those with normalized conductivity values lower than 1 (one) or by the color tending towards blue.

It should be noted that, although the present invention has been described in relation to the attached drawings, it may be subjected to modifications and adaptations by the skilled person, depending on the specific instance, but as long as it is within the inventive scope defined herein.

The invention claimed is:

1. A device for reducing multiphase flow instability in pipes, the device comprising:
   a pipe spool extending between a first end and a second end, the pipe spool having a longitudinal axis therebetween, the pipe spool defining a flow passage extending therethrough and a flow restriction within the flow passage; and
   an external notch defined by the pipe spool at the flow restriction,
   wherein the flow restriction is asymmetric across the longitudinal axis of the pipe spool, and the flow restriction having the following geometric parameters:
      a ratio of a height of the flow passage at a peak of the flow restriction to a diameter of the flow passage is greater than 0.1 and lower than 0.9, the peak of the flow restriction being substantially parallel to the flow passage;
      an angle of a leading portion of the flow restriction relative to the peak of the flow restriction is greater than 20° and less than 70°;
      an angle of a trailing portion of the flow restriction relative to the peak of the flow restriction is greater than 10° and less than 70°; and
      a ratio of a length of the peak of the flow restriction and the diameter of the flow passage ranges from about 0.20 to about 1.0.

2. The device according to claim 1, wherein the ratio of the height of the flow passage at the peak of the flow restriction to the diameter of the flow passage is greater than 0.1 and less than 0.5.

3. The device according to claim 1, wherein the angle of the leading portion of the flow restriction relative to the peak of the flow restriction is greater than 20° and less than 45°.

4. The device according to claim 1, wherein the angle of the trailing portion of the flow restriction relative to the peak of the flow restriction is greater than 10° and less than 45°.

5. The device according to claim 4, wherein the angle of the trailing portion of the flow restriction relative to the peak of the flow restriction is 25°.

6. The device according to claim 1, wherein a ratio between the length of the peak of the flow restriction and a length of the total flow restriction is from about 0.20 to about 0.80.

7. The device according to claim 1, wherein the ratio of the length of the peak of the flow restriction and the diameter of the flow passage is about 0.20 to about 0.80.

8. The device according to claim 1, wherein the device is configured to receive a flow that comprises multiphase gas-liquid or vapor-liquid.

9. The device according to claim 1, wherein the flow restriction is a first flow restriction, the device further comprising a second flow restriction, the second flow restriction being a distance from the first flow restriction, wherein a ratio of the distance between the first flow restriction and the second flow restriction and the diameter of the flow passage is from about 25 to about 100.

10. The device according to claim 1, wherein the pipe spool is configured to receive a fluid flow in a horizontal or inclined orientation.

11. The device according to claim 1, wherein the external notch has a profile parallel to the flow restriction.

* * * * *